United States Patent [19]
Kawase et al.

[11] Patent Number: 5,746,676
[45] Date of Patent: May 5, 1998

[54] FRICTION TYPE CONTINUOUSLY VARIABLE TRANSMISSION

[75] Inventors: Tatsuo Kawase; Naoshi Hattori; Takashi Nozaki; Tomoaki Makino; Takahide Saito, all of Iwata, Japan

[73] Assignee: NTN Corporation, Osaka, Japan

[21] Appl. No.: 596,110

[22] PCT Filed: Apr. 27, 1995

[86] PCT No.: PCT/JP95/00840

§ 371 Date: May 29, 1996

§ 102(e) Date: May 29, 1996

[87] PCT Pub. No.: WO95/33147

PCT Pub. Date: Dec. 7, 1995

[30] Foreign Application Priority Data

May 31, 1994 [JP] Japan .................................. 6-118741
May 31, 1994 [JP] Japan .................................. 6-118790
Jun. 29, 1994 [JP] Japan .................................. 6-147763

[51] Int. Cl.[6] .......................... F16H 15/16; F16H 57/04
[52] U.S. Cl. ......................... 476/50; 475/214; 476/8; 476/33
[58] Field of Search .................. 476/8, 33, 50; 475/193, 214

[56] References Cited

U.S. PATENT DOCUMENTS

| | | | |
|---|---|---|---|
| 2,886,986 | 5/1959 | Kopp | 475/194 |
| 3,420,122 | 1/1969 | Okabe | 476/50 |
| 3,598,740 | 8/1971 | Duling et al. | 476/8 |
| 5,334,097 | 8/1994 | Tatara et al. | 476/8 |

*Primary Examiner*—Allan D. Herrmann
*Attorney, Agent, or Firm*—Wenderoth, Lind & Ponack

[57] ABSTRACT

A friction type continuously variable transmission has double cones kept in contact with an input shaft and a drive cone and is capable of transmitting the rotation of the input shaft to an output shaft so that the output shaft rotates at a higher speed than the input shaft. A mechanism is provided for preventing the double cones from rotating about the input shaft and from coming off of their support shafts. A stay is mounted on a carrier supporting the double cones. The stay carries a guide roller bearing received in a guide fixed to a housing of the transmission. The stay thus prevents the rotation of the carrier while allowing only its axial movement. A stopper surface is provided at one end of the guide to restrict the axial movement of the carrier within a predetermined range.

7 Claims, 15 Drawing Sheets

FRICTION TYPE CONTINUOUSLY VARIABLE TRANSMISSION

BACKGROUND OF THE INVENTION

1. Technical Field

This invention relates to a friction type continuously variable transmission for variably adjusting the rotational speed of a drive shaft such as an impeller of a centrifugal blower, a centrifugal compressor or a radial turbine.

2. Background Art

Unexamined Japanese Utility Model Publication 3-5948 discloses a conventional friction type variable transmission capable of rotating an output shaft at a constant speed in spite of the change of the rotational speed of an input shaft by variably adjusting a shaft for driving a high-speed rotary member such as an impeller.

FIG. 14 shows this transmission. It has an input shaft 2 and an output shaft 3 supported by bearings in a housing 1 at both ends so as to be coaxial with each other. A plurality of double cones 4 are arranged around the output shaft 3. They are rotatably mounted on support shafts 6 fixed to a carrier 5 axially movably mounted on the output shaft 3.

The input shaft 2 has at its inner end an integral input ring 7 kept in contact with one conical surface 4a of each double cone 4. The output shaft 3 carries at its inner end a drive cone 8 that contacts the other conical surface 4b of each double cone 4.

A holder 10 is fixed to an outer ring of a bearing 9 supporting the input shaft 2. A plurality of springs 11 are disposed circumferentially between the holder 10 and the housing 1 to axially pull the input shaft 2 via the bearing 9. As the input shaft 2 is pulled by the springs 11, the double cones 4 and thus the output shaft 3 are also pulled in the same direction. But since the output shaft 3 is fixed to the housing, a force that reacts to the biasing force of the springs 11 is produced, so that the input shaft and the output shaft are subjected to a tensile force that tends to pull them away from each other.

When the input shaft 2 is rotated, its rotation is transmitted through the input ring 7 to the double cones 4, and then through the drive cone 8 to the output shaft 3. An impeller mounted on the output shaft 3 is thus rotated. To change the rotational speed of the output shaft 3, the double cones 4 are moved axially of the output shaft 3 by controlling a carrier moving means 12 for axially moving the carrier 5.

In this way, the rotation of the input shaft 2 is transmitted through the input ring 7 to the double cones 4, which are pressed against the input ring 7 under the force of the springs 11. The rotational speed of the output shaft 3 is determined by the axial position of the double cones 4. Thus, it is important that the carrier 5 supporting the double cones 4 and its inner guide 13 be axially movable with sufficient smoothness.

In this respect, the conventional carrier moving means 12 for axially moving the carrier 5 is a rack-and-pinion mechanism, which cannot prevent the rotation of the carrier 5. Thus, when the input shaft 2 is rotated, the double cones 4 tend to rotate about the center axis of the carrier guide 13 while rotating about their own axes. The rotation of the double cones 4 about the carrier guide 13 may have detrimental effects, such as an abrupt change in the speed ratio or the separation of the joint between the carrier moving means 12 and the carrier 5.

If the carrier 5 moves axially out of the permissible range, the double cones 4 will disengage from the drive cone 8 or the input ring 7, making the transmission of torque impossible.

If the input shaft is rotated at a high speed, the double cones 4, rotatably mounted on the support shafts 6 protruding from the carrier 5, are rotated at a correspondingly high speed, so that they may come off of the support shafts 6 because of their own inertia and consequently disengage from the drive cone 8 and the input ring 7.

In this arrangement, whenever the input shaft 2 is rotating, its rotation is transmitted through the integral input ring 7 to the double cones 4 because the input ring 7 is always pressed against the double cones 4 under the force of the springs 11. The double cones 4 are kept rotating and thus the output shaft 3 is thus rotated whenever the input shaft 2 is rotating.

Suppose now that this friction type variable transmission is mounted on an automobile as a speed-up device. Its input shaft 2 is coupled to the engine crankshaft directly or through a pulley or a belt to increase or reduce its speed before being transmitted to the input shaft. While the engine is running and thus the crankshaft is rotating, the input shaft 2 is rotated. As mentioned above, while the input shaft 2 is rotating, the output shaft 3 is always rotated.

When used for this application, the output shaft 3 need not be rotated while the engine revolving speed is within a certain range. But it is structurally impossible to stop the rotation of the output shaft 3 as long as the input shaft 2 is rotating. Since the output shaft is unnecessarily rotated, engine power is wasted.

Since the output shaft and other rotary parts of the friction type variable transmission are always rotated even while they need not be rotated, they tend to wear quickly, thus shortening the life of the entire transmission.

FIG. 15 shows another conventional transmission which, in order to increase the rotational speed of the output shaft compared to the input rotational speed, includes a planetary gear unit 20 coupled to the input shaft 2 of the friction type variable transmission unit shown in FIG. 14. The gear unit 20 increases and transmits the rotation of its input shaft 25 to the input shaft 2 of the transmission unit.

The planetary gear unit 20 comprises an internal gear 22, a plurality of planetary gears 23 provided inside and meshing with the internal gear 22, a carrier 24 coupled to the input shaft 25 and supporting the planetary gears 23, and a sun gear 26 meshing with the planetary gears 23 and fixed to the input shaft 2 of the transmission unit.

When the input shaft 25 of the planetary gear unit 20 rotates, the planetary gears 23, meshing with the internal gear 22, begin rotating about the sun gear 26 while rotating about their own axes. The input shaft 2 of the transmission unit is thus rotated at an increased speed, so that the impeller 14 mounted on the output shaft 3 rotates at a high speed.

In order to lubricate the inner parts of the transmission unit and the planetary gear unit 20 in an optimum way, it is preferable to circulate lubricant through the transmission. Heretofore, in order to circulate lubricating oil, an oil pump was provided outside the transmission to circulate lubricating oil through an external pipes connecting the oil pump to inner parts of the transmission which have to be lubricated.

In this arrangement, since the external pipes and the oil pump are provided outside the housing of the transmission, the size of the entire device is rather massive, so that a large installation space is needed.

Today, smaller friction type variable transmissions are required.

In an arrangement in which the parts in the transmission are lubricated by dripping oil from the top of the housing, no optimum lubrication of these parts is possible. Namely, if the amount of oil supplied to these parts is scarce, they cannot be lubricated sufficiently. If too much oil is supplied, oil leakage may occur.

Moreover, with this arrangement, lubricating oil tends to be carried away by the flow of air in the housing caused by the rotating double cones 4 and input ring 7, making it even more difficult to supply a sufficient amount of lubricating oil to desired locations.

SUMMARY OF THE INVENTION

A first object of this invention is to provide a friction type variable transmission having means for restricting the movement of its double cones and carrier within proper ranges so that it can stably perform its variable speed transmission function.

A second object of this invention is to provide a mechanism which can selectively stop the rotation of the transmission without impairing its function as a friction type variable transmission.

A third object of this invention is to provide a friction type variable transmission having a lubricating oil circulation means which is compact and can circulate lubricating oil smoothly.

According to a first aspect of the invention, there is provided a friction type continuously variable speed transmission comprising an input shaft, an output shaft and a plurality of double cones kept in contact with both the input shaft and the output shaft for transmitting the rotation of the input shaft to the output shaft. A carrier is slidably mounted on the output shaft for changing the revolving speed of the output shaft by moving the double cones in the axial direction of the input shaft. A rotation preventive means is provided for preventing the rotation of the carrier about the output shaft while allowing its axial movement along the output shaft.

According to a second aspect of the invention, there is provided a friction type continuously variable transmission comprising an input shaft, an output shaft provided coaxially with the input shaft and a plurality of double cones kept in contact with both the input shaft and the output shaft so as to be movable in the axial direction of the input and output shafts. A biasing means biases the input shaft away from the double cones so that the double cones are pulled by the input shaft and the output shaft in opposite directions. A clutch is coupled to the input shaft for selectively transmitting and cutting off a driving force to the input shaft, and a rotation preventive means is provided between the input shaft of the friction type continuously variable transmission and the clutch for preventing the rotation of the input shaft relative to the clutch while allowing axial movement of the input shaft.

According to a third aspect of the invention, there is provided a friction type continuously variable transmission comprising a friction type variable transmission unit having a housing and an input member. A gear unit is coupled to the input member and has an input shaft for transmitting the rotation of the input shaft to the input member. An oil tank is provided below the transmission unit and the gear unit and an oil pump is mounted on the input shaft of the gear unit for suctioning the lubricating oil in the oil tank. The housing of the transmission unit is provided with a passage through which the lubricating oil suctioned by the oil pump is supplied to necessary parts of the transmission unit.

In the first aspect of the invention, the rotation preventive means prevents the rotation of the carrier supporting the double cones while allowing only its axial movement. The double cones are thus prevented from rotating around the input shaft.

By providing a stopper for restricting the axial movement of the carrier and/or by providing the support shafts for the double cones with large-diameter portions to prevent the double cones from coming off of the shafts, it is possible to restrict the movement of the double cones within a proper range. This makes it possible to prevent the double cones from getting out of contact with the input or output shaft.

In the second aspect of the invention, to transmit the driving force to the input shaft, the input shaft is coupled to the drive source by engaging the clutch. By disengaging the clutch, the input shaft is disconnected from the driving source, so that no driving force is transmitted to the input shaft.

By coupling the input shaft to the clutch through the rotation preventive means which allows axial movement of the input shaft, it is possible to prevent the input shaft from interfering with the clutch even if it moves axially. This makes it possible to apply the axial forces of the input shaft to the double cones in an optimum way.

In the third aspect of the invention, the lubricating oil in the oil tank is suctioned by the oil pump linked to the input shaft of the planetary gear unit, and supplied through the passage formed in the housing to various parts of the transmission. The oil circulated through the transmission is returned to the oil tank.

DETAILED DESCRIPTION OF THE PREFERRED EMBODIMENT

Now reference is made to the drawings to describe the embodiments of this invention. The friction type variable transmission according to this invention is basically the same in its structure and function as the conventional device shown in FIG. 14. Thus, the same elements are denoted by the same numerals and their description is omitted.

Figure 1:
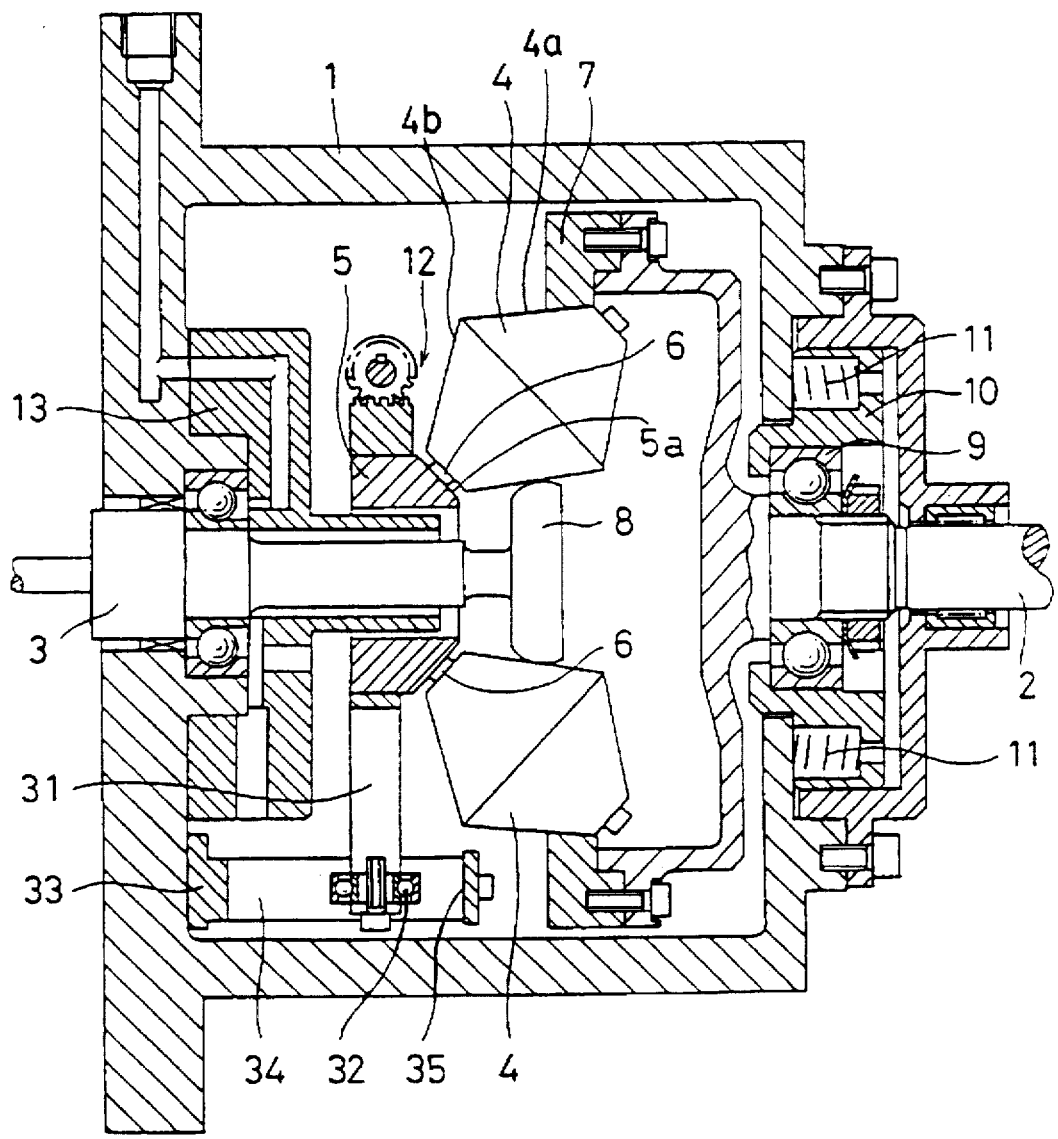
FIG. 1 is a vertical sectional front view of a first embodiment according to a first aspect of the invention.
Figure 2:
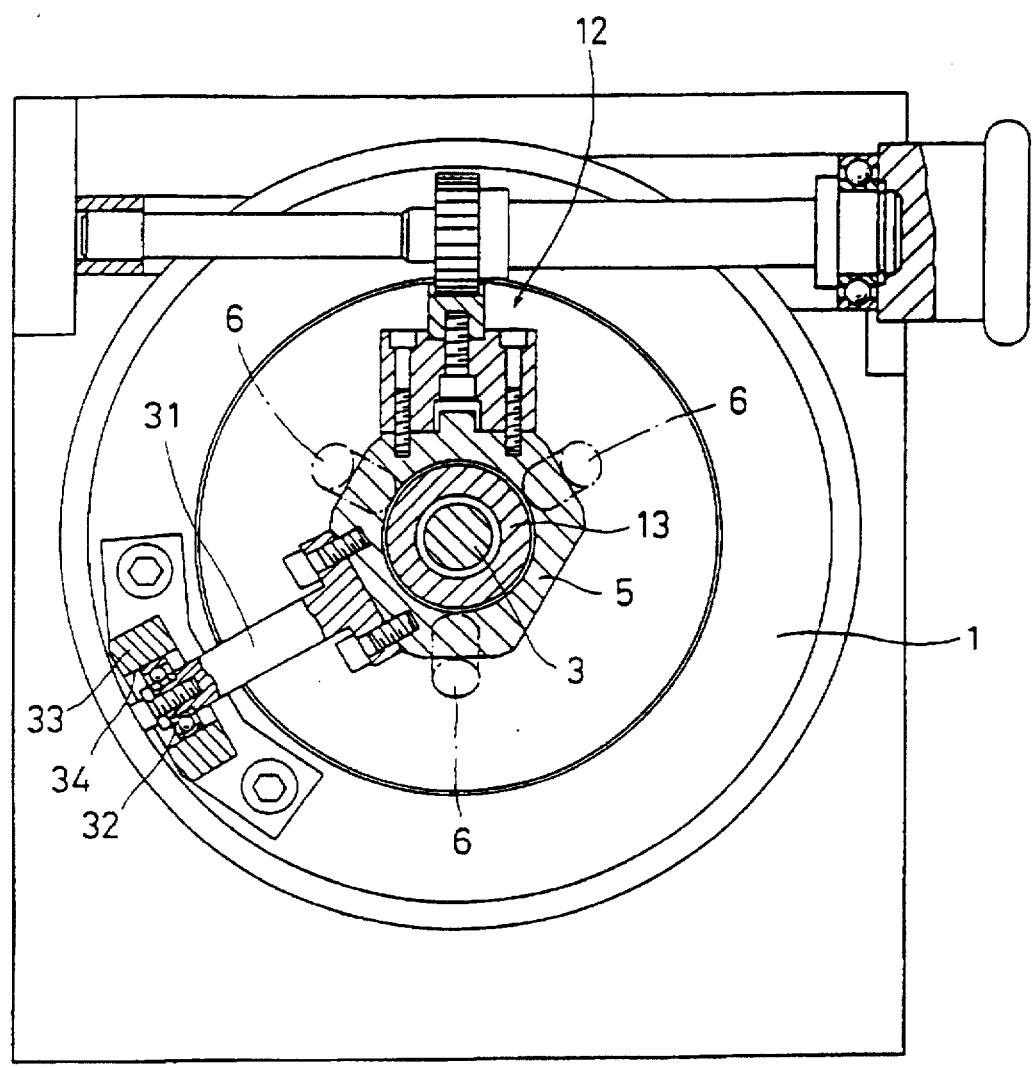
FIG. 2 is a vertical sectional side view of the same.

FIGS. 1 and 2 show the first embodiment of a first aspect of the invention. In this embodiment, the carrier 5 is axially slidable along a carrier guide 13 mounted on the housing 1. It has a front circumferential tapered surface 5a from which three support shafts 6 protrude. A double cone 4 is supported on each support shaft 6. A stay 31 extends radially from the outer periphery of the carrier 5 near its rear end so as not to interfere with the support shafts 6. A rolling bearing as a guide roller bearing 32 is mounted on the free end of the stay 31.

An axial guide 33 is bolted to the rear end face of the housing 1. It has a guide hole 34 elongated in the axial direction of the output shaft 3. The guide roller bearing 32 is received in the hole 34, which is wide enough for the guide roller bearing 32 to be smoothly rollable in the axial direction.

A stopper surface 35 is formed at the front end of the guide hole 34. It prevents, by abutting the guide roller bearing 32, the double cones 4 from moving rightwardly in FIG. 1 beyond the range within which they are in contact with the drive cone 8 and the input ring 7.

Now in operation, when the input shaft 2 is rotated and the double cones 4 begin to rotate about their axes, a rotating force acts on the carrier 5. But the carrier 5 will never actually turn because the guide roller bearing 32 is received in the guide hole 34. Namely, the carrier 5 and the double cones 4 are only slid axially by the carrier moving means 12.

If the double cones 4 move rightwardly to the limit of the permissible range within which they are in contact with both the drive cone 8 and the input ring 7, the guide roller bearing 32 abuts the stopper surface 35, so that the double cones cannot move rightwardly beyond the permissible range.

Two or more stays 31 may be provided on the outer periphery of the carrier 5 of this embodiment.

The guide 33 may be mounted on the inner periphery of the housing 1, or on the carrier guide 13 fixed to the housing 1.

While the stay 31 and the guide 33 are kept in rolling contact with each other through the guide roller bearing 32 in the embodiment, they may be kept in sliding contact through a sliding member having a small slide friction coefficient.

Figure 3:
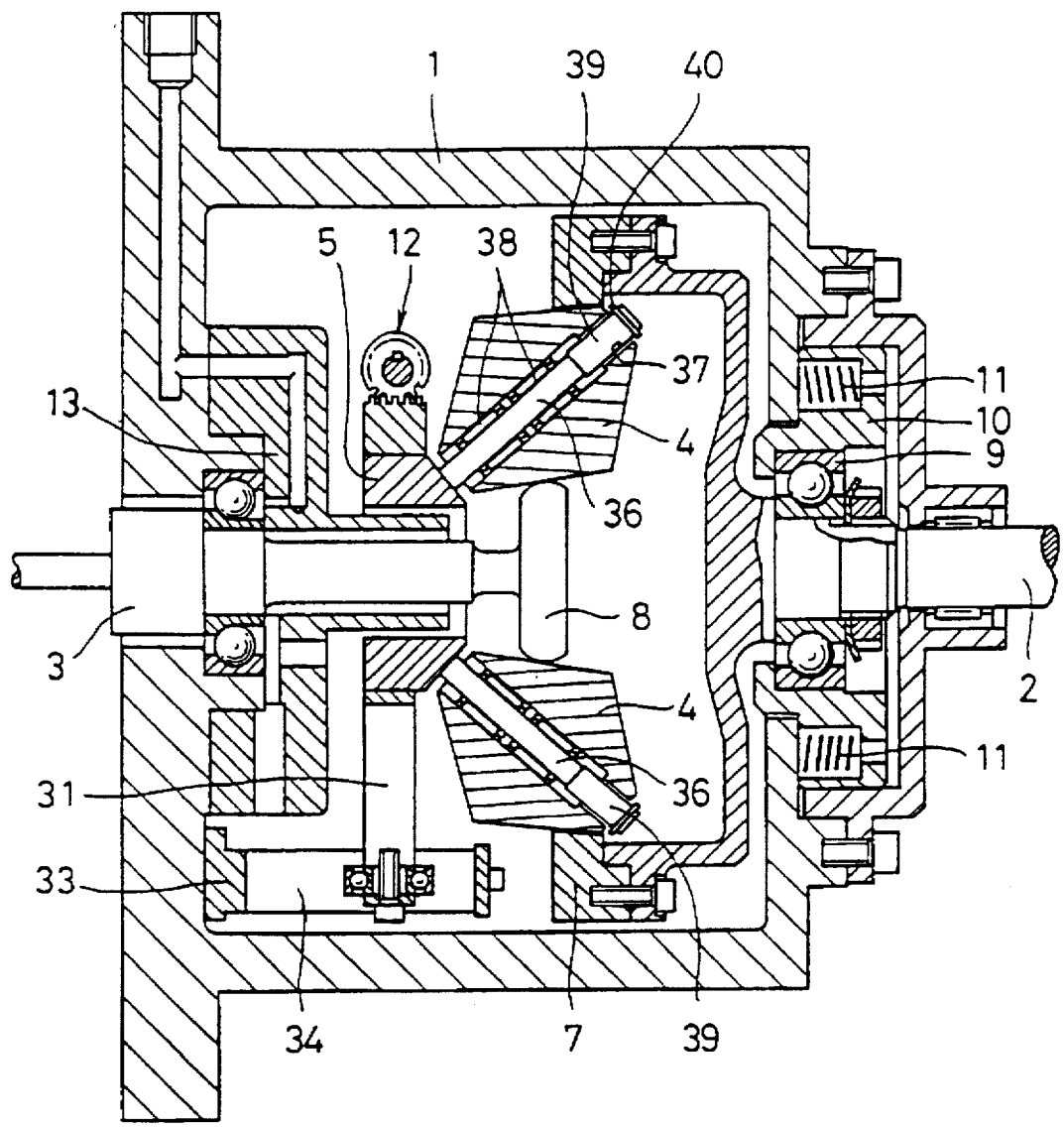
FIG. 3 is a vertical sectional front view of a second embodiment.
Figure 4:
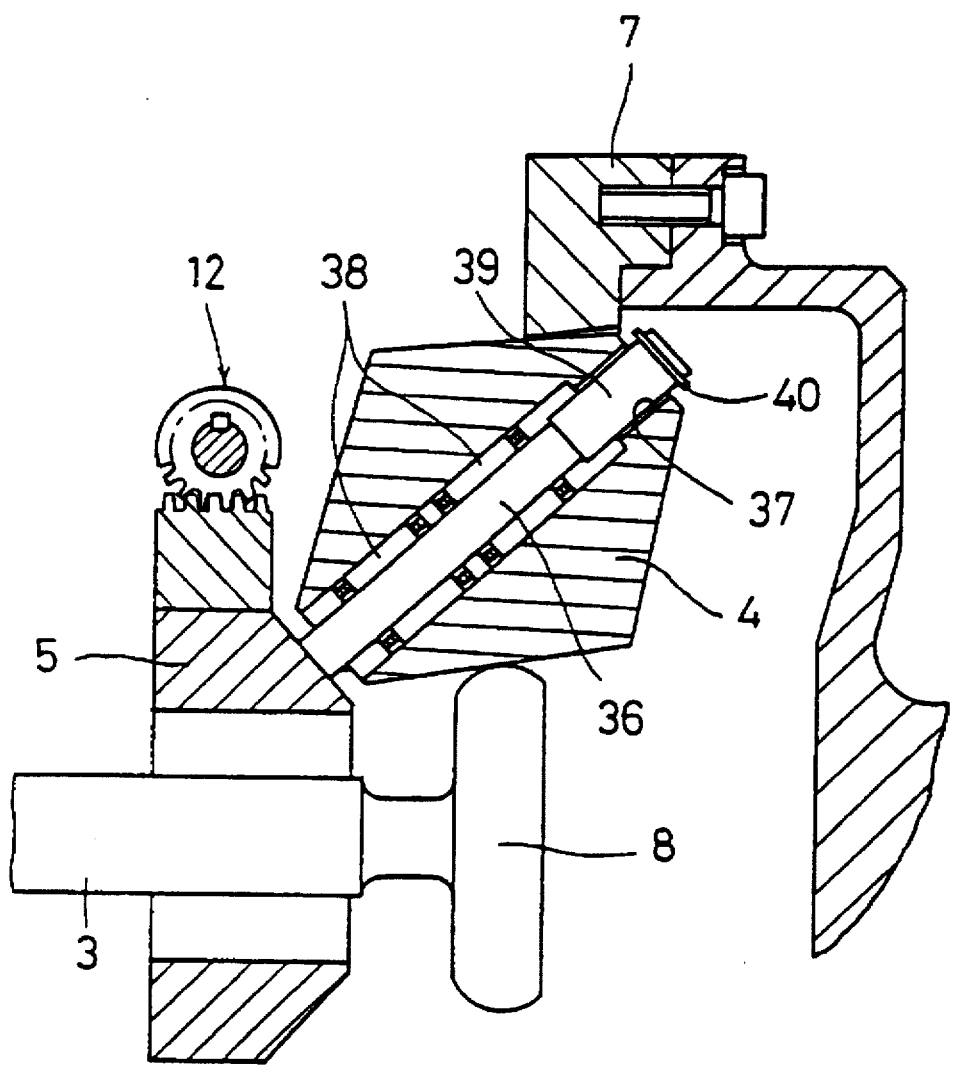
FIG. 4 is a partial enlarged sectional view of the same.

FIGS. 3 and 4 show a second embodiment according to the first aspect of the invention.

In this embodiment, support shafts 36 protruding from the front end of the carrier 5 are inserted in through holes 37 formed in the double cones 4 to rotatably support the double cones 4 through needle bearings 38.

Each support shaft 36 has an end member 39 formed with a flange 40 having a larger diameter than the opening of the through hole 37 formed in each double cone 4.

If the double cones 4, being rotated at high speed, are moved axially outwardly along the support shafts 36 due to centrifugal force, they will abut the large-diameter flange 40 of the end member 39 of each support shaft 36, so that they will never come off of the support shafts 36. Namely, the double cones 4 are kept in proper engagement with both the drive cone 8 and the input ring 7 even while they are rotating at a high speed.

Figure 5:
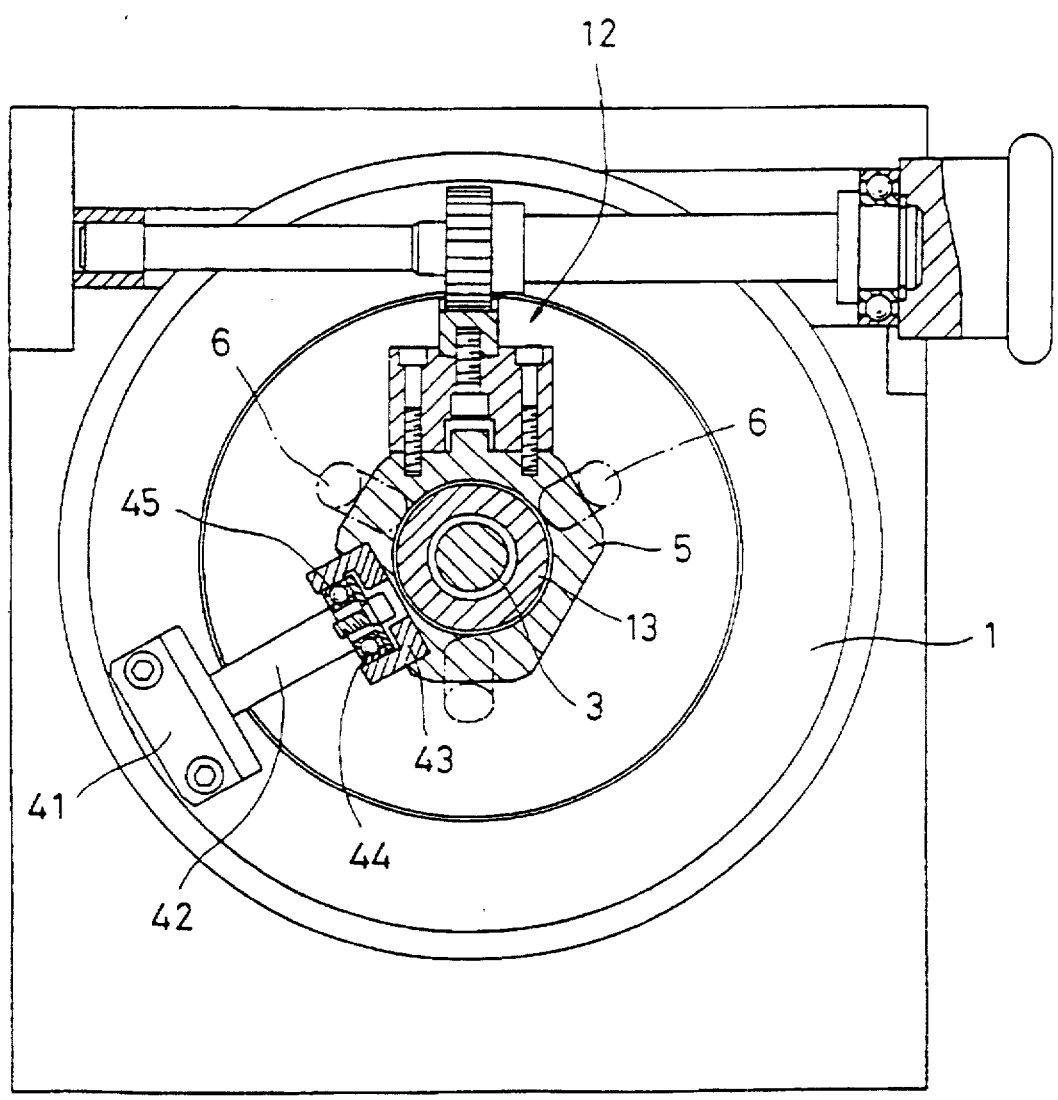
FIG. 5 is a vertical sectional side view of a third embodiment.

FIG. 5 shows a third embodiment of the first aspect of the invention. In this embodiment, an L-shaped stay 41 is fixed to the rear end face of the housing 1. It carries on its front end another stay 42 extending toward the carrier 5.

A guide 43 is fixedly mounted on the outer periphery of the carrier 5. It is formed with an axially extending guide groove 44 in which is slidably received a guide roller bearing 45 mounted on the end of the stay 42.

The carrier 5 is thus guided by the bearing 45 in the guide groove 44 so as to be movable only in the axial direction. Similar to the embodiment of FIG. 1, a stopper surface for limiting the axial movement of the carrier 5 is provided at the front end of the guide groove 44.

Figure 6:
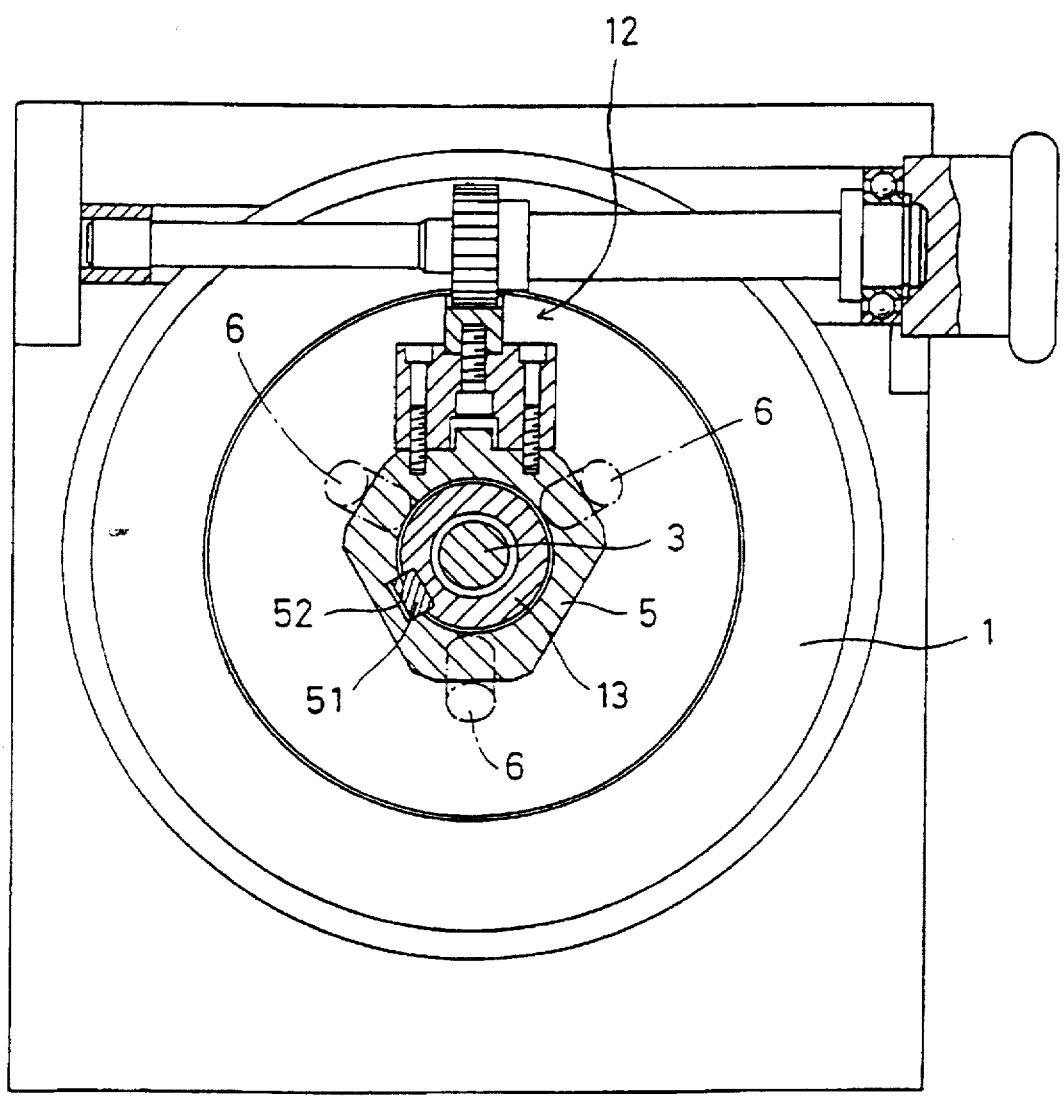
FIG. 6 is a vertical sectional side view of a forth embodiment.

FIG. 6 shows a fourth embodiment according to the first aspect of the invention. In this embodiment, a guide 51 is fixed to a fixed carrier guide 13. The carrier 5 is slidably mounted on the carrier guide 13. The carrier 5 is formed with an axially extending guide groove 52 in which is received the guide 51 to prevent the carrier 5 from rotating relative to the carrier guide 13. A stopper surface for limiting the axial movement of the guide may be provided at the front end of the guide groove 52.

Figure 7:
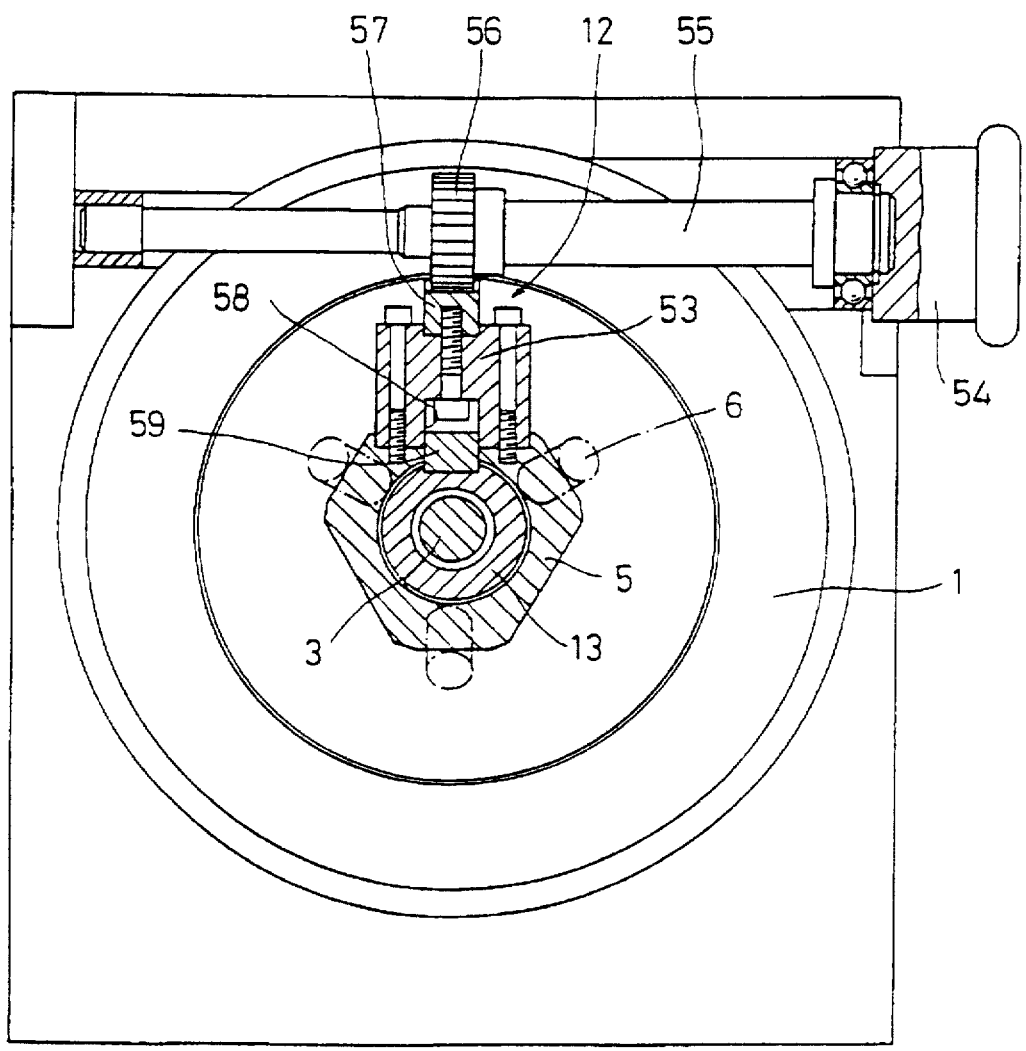
FIG. 7 is a vertical sectional side view of a fifth embodiment.

FIG. 7 shows a fifth embodiment of the first aspect of the invention. In this embodiment, a rack holder 53 of the carrier moving means 12 is designed so that it can prevent the rotation of the carrier 5.

The carrier moving means 12 comprises a driving means 54, a shaft 55 coupled to the driving means 54, a pinion 56 mounted on the shaft 55, a rack 57 meshing with the pinion 56, and the rack holder 53 through which the rack 57 is fixed to the carrier 5. The rack holder 53 is formed with an axially extending guide groove 58 in its bottom. The carrier guide 13 has a guide 59 axially slidably received in the guide groove 58 to allow only axial movement of the carrier 5 while preventing its rotation.

Figure 8:
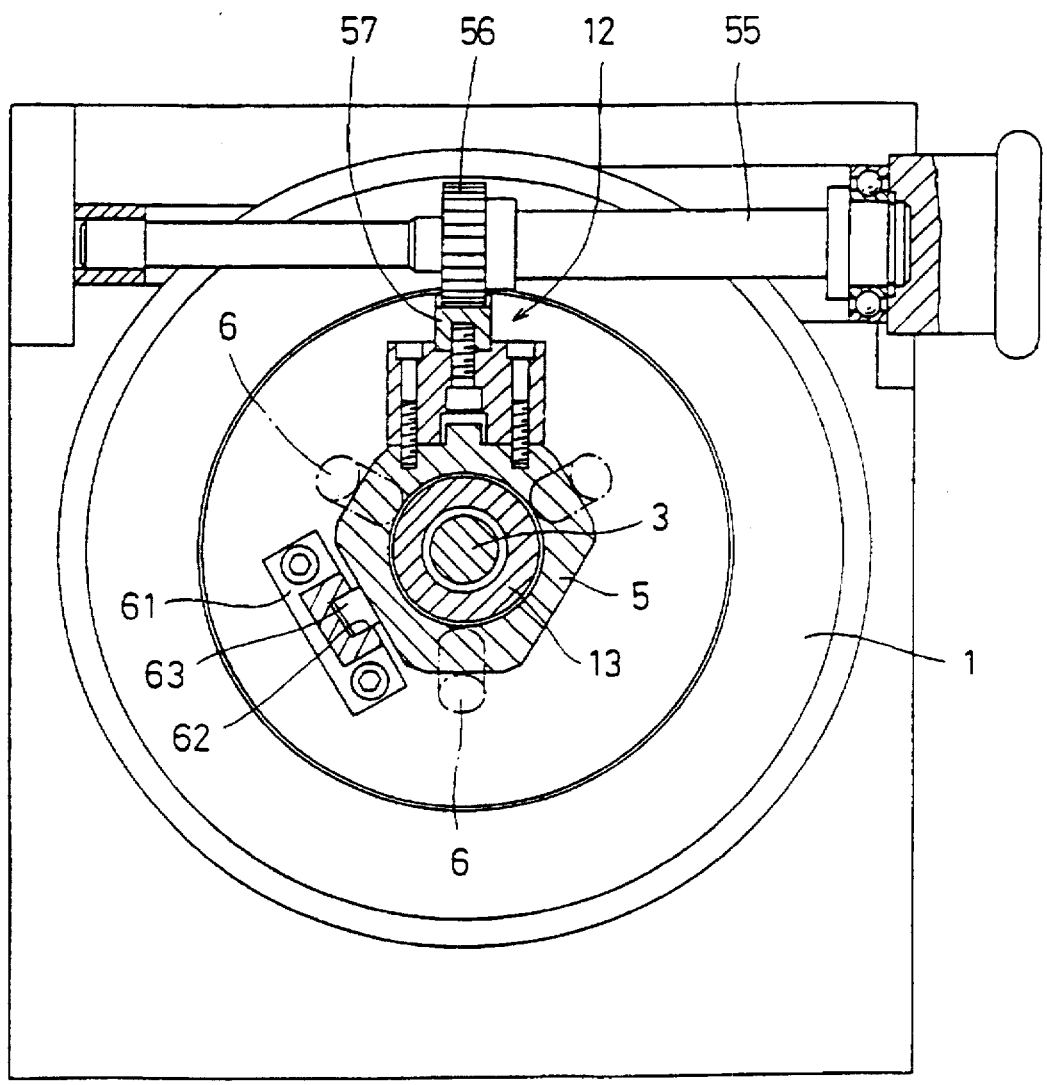
FIG. 8 is a vertical sectional side view of a sixth embodiment.

FIG. 8 shows a sixth embodiment of the first aspect of the invention, in which the rotation preventive means comprising the guide and the guide groove is not provided between the carrier 5 and the carrier guide 13 as in the third and fourth embodiments, but outside the carrier 5.

Namely, an axially extending guide groove 62 is formed in a member 61 fixed to a large-diameter portion the carrier guide 13. A guide 63 mounted on the outer periphery of the carrier 5 is received in the guide groove 62 to hold the carrier 5 so as to be slidable in the axial direction.

Figure 9:
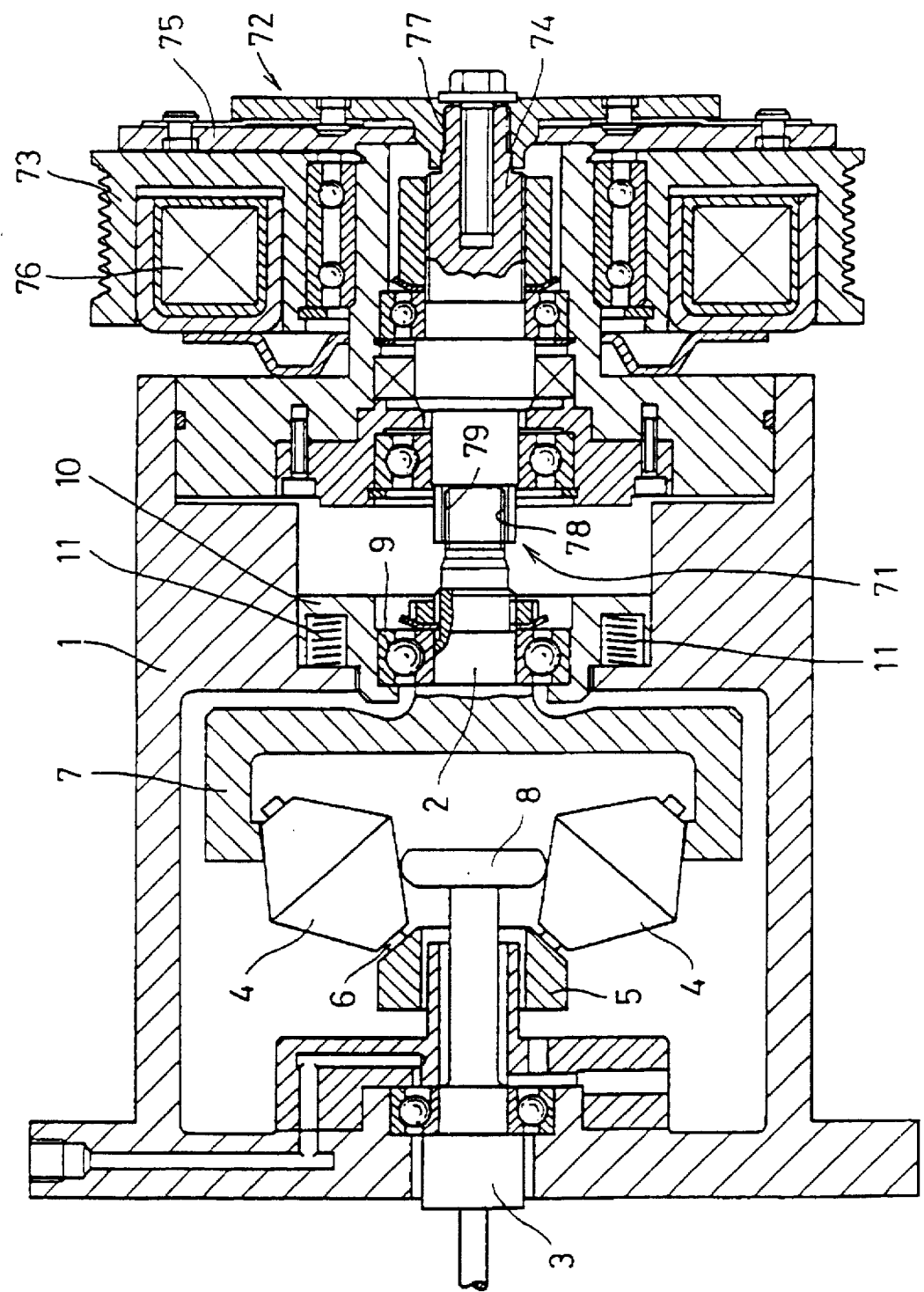
FIG. 9 is a vertical sectional view of one embodiment according to a second aspect of the invention.

FIG. 9 shows the friction type variable transmission embodying a second aspect of the invention.

This transmission comprises a friction type variable transmission unit mounted in the housing 1, and an electromagnetic clutch 72 coupled through a rotation preventive means 71 to the input shaft 2 of the transmission unit. The electromagnetic clutch 72 has a clutch pulley 73 coupled to a driving source (not shown) through a belt.

The friction type variable transmission unit is structurally the same as those in the previous embodiments. Its description is thus omitted.

The electromagnetic clutch 72 comprises a clutch shaft 74 coupled to the input shaft 2. The clutch pulley 73 is rotatably mounted around the clutch shaft 74. An electromagnetic clutch plate 75 is provided at one end of the clutch pulley 73, and an electromagnet 76 is mounted in the clutch pulley 73 at the other end thereof. The electromagnetic clutch plate 75 is axially movably coupled to one end of the clutch shaft 74 through splines 77. When the electromagnet 76 is activated, the clutch plate 75 is attracted to the clutch pulley 73, so that the driving force applied to the clutch pulley 73 is transmitted through the clutch plate 75 to the clutch shaft 74.

The rotation preventive means 71, through which the clutch shaft 74 is coupled to the input shaft 2 has in one end of the clutch shaft 74 a hollow 78 in which is received the end of the input shaft 2. Axial splines 79 are formed on the inner surface of the hollow 78 and the outer surface of the end of the input shaft 2 inserted in the hollow 78. By the engagement of splines 79, torque is transmitted between the clutch shaft 74 and the input shaft 2 while they are axially movable relative to each other.

The splines 79 may be involute splines, i.e., splines having an involute sectional shape, or may be ball-splines, i.e. splines with balls received between the splines.

If this friction type variable transmission is used as a speed increaser for an automotive engine, the clutch pulley 73 of the electromagnetic clutch 72 is coupled to an engine pulley through a belt to transmit the rotation of the engine crankshaft to the electromagnetic clutch 72.

Once coupled, the clutch pulley 73 is kept rotated by the engine as long as the engine is running irrespective of whether the variable transmission is used or not.

In order to increase the engine rotational speed using the friction type variable transmission, the electromagnet 76 of the electromagnetic clutch 72 is activated to attract the electromagnetic clutch plate 75 against the clutch pulley 73. Now speed is changed while the rotation of the engine is transmitted through the clutch shaft 74 to the input shaft 2, and then through the input ring 7, double cones 4 and drive cone 8 to the output shaft 3.

If the operation of the friction type variable transmission is not needed while the engine runs, the electromagnetic clutch plate 75 is simply separated from the clutch pulley 73 of the electromagnetic clutch 72. In this state, the rotary elements in the friction type variable transmission, except for the clutch pulley 73, are not rotating, so that engine power is not wasted. It is possible to reduce the wear of these rotary members, too.

During operation, although the input shaft 2 is axially biased by the springs 11, the rotation preventive means 71 blocks the input shaft 2 from moving toward the clutch shaft 74, so that they will not interfere with each other. Thus, the biasing force of the springs 11 is transmitted to the input shaft 2 and the double cones 4 without fail, so that the shaft 2 an of the input shaft 2 and the output shaft 3 which acts on the double cones 4 can be controlled to a predetermined constant level.

In this embodiment, the electromagnetic clutch 72 is used to selectively connect and disconnect the input shaft 2 to and from the engine. But a mechanical, hydraulic or any other type of clutch having the same function may be used instead.

Instead of the rotation preventive means 71, comprising the splines formed on the input shaft 2 and the clutch shaft 74 by machining, a rotation preventive means that are separate from both shafts may be provided therebetween.

Figure 10:
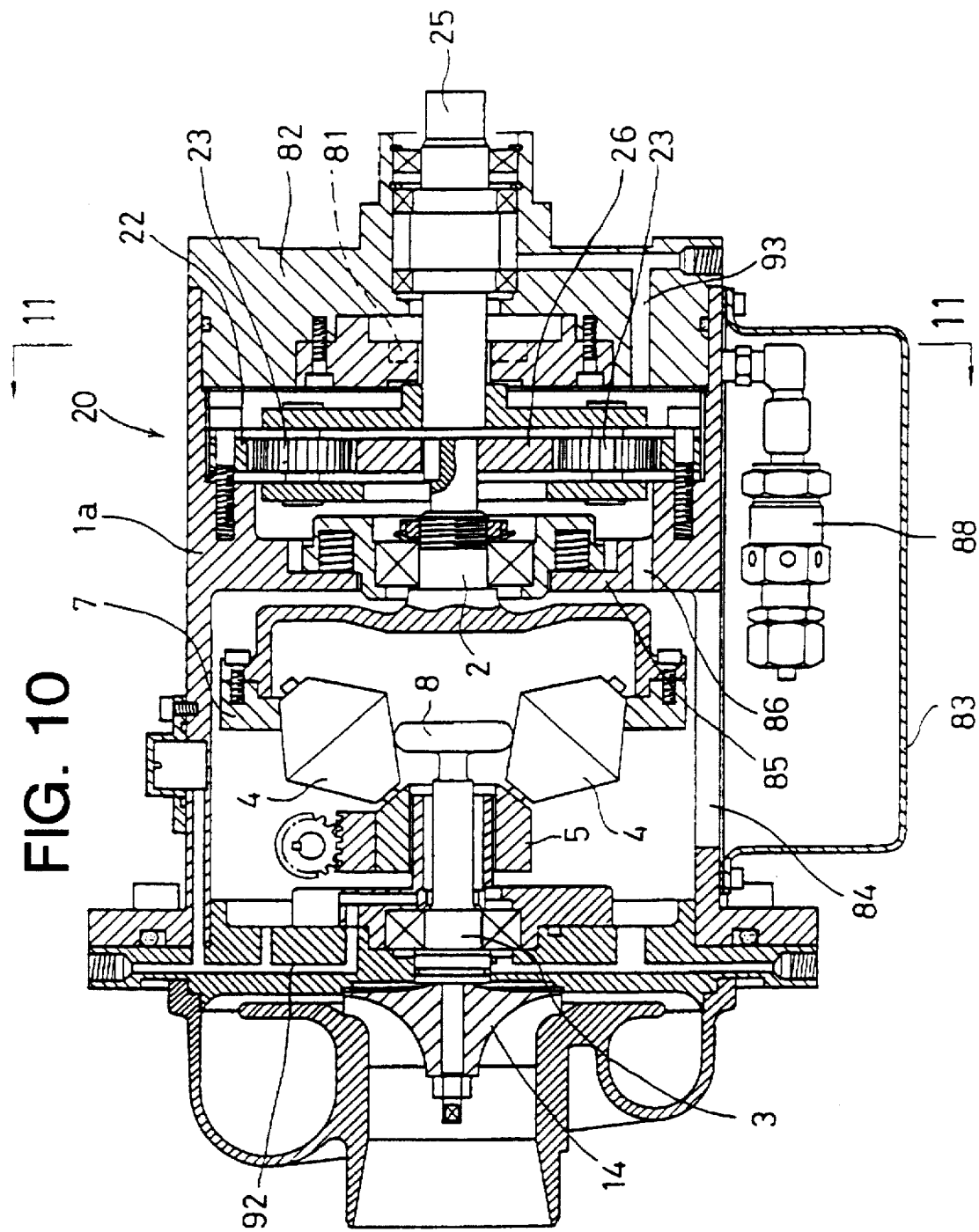
FIG. 10 is a vertical sectional view of one embodiment according to a third aspect of the invention.
Figure 11:
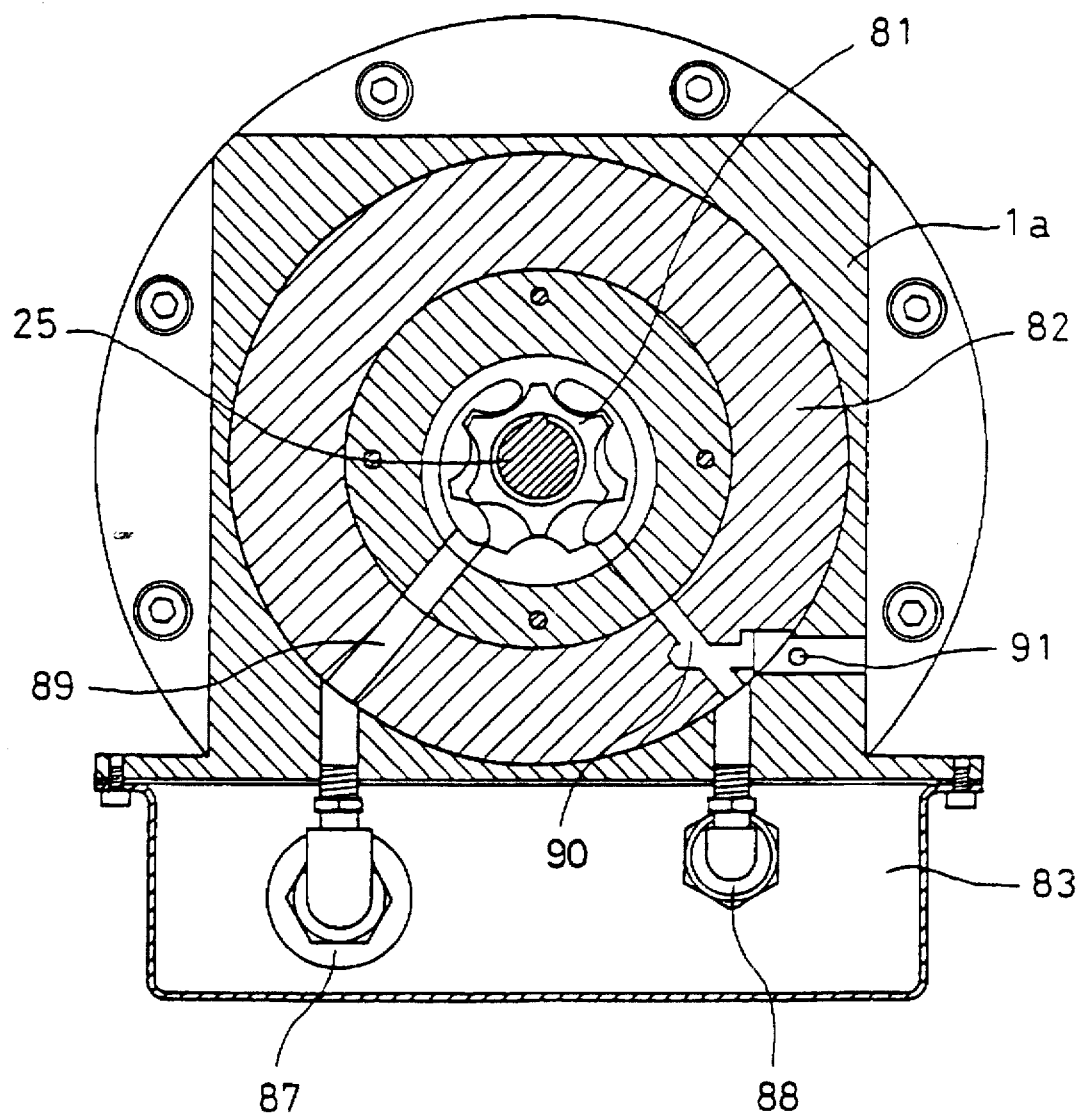
FIG. 11 is a sectional view taken along line 11—11 of FIG. 10.

FIGS. 10 and 11 show an embodiment of a third aspect of the invention. The friction type variable transmission of the third aspect of the invention comprises a friction type variable transmission unit, a planetary gear unit 20 coupled to the input member of the transmission unit, and an impeller 14 mounted on the output member of the transmission unit. The rotation of the planetary gear unit 20 is increased by its planetary gears and then by the friction type variable transmission unit to rotate the impeller 14 at high speed.

Figure 14:
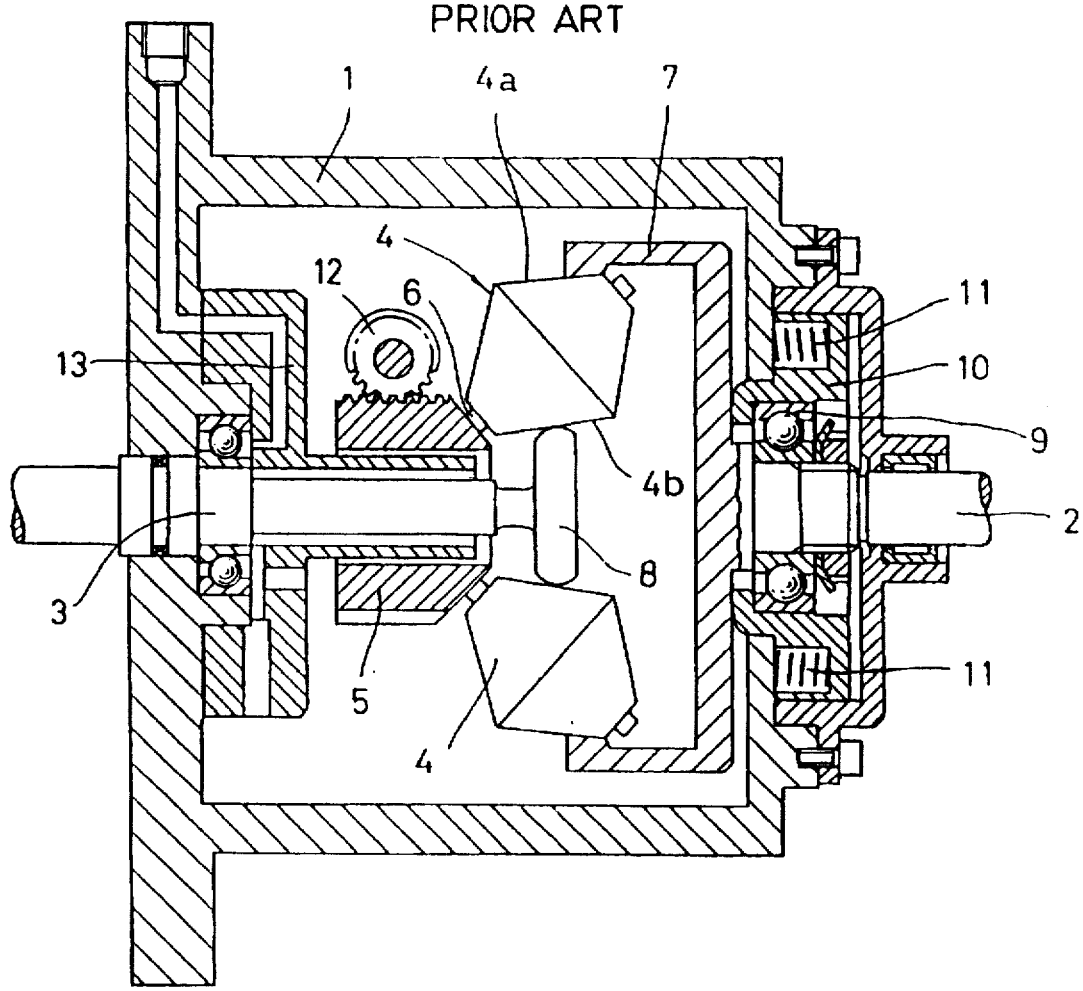
FIG. 14 is a vertical sectional view of a conventional device.
Figure 15:
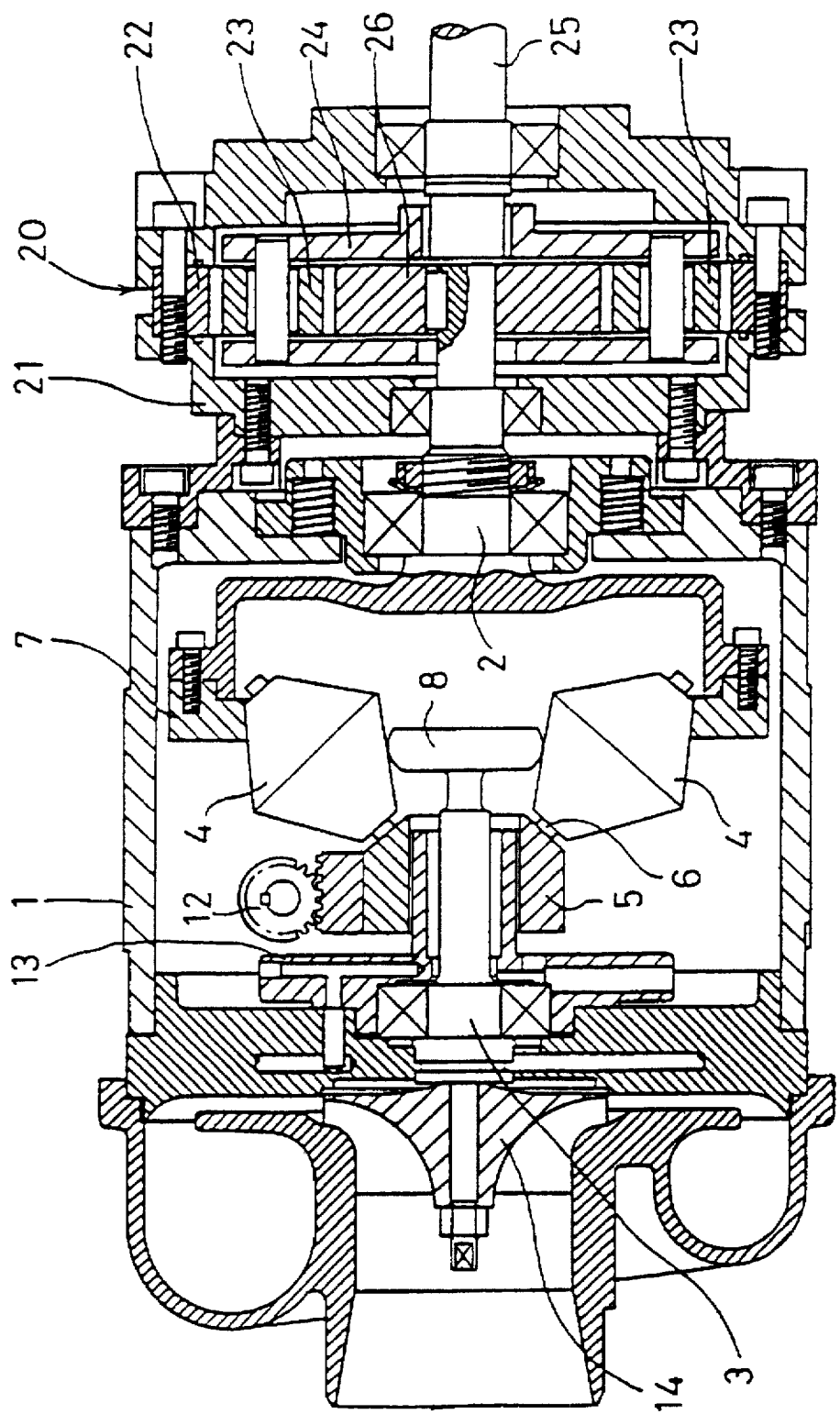
FIG. 15 is a vertical sectional view of a conventional device including a planetary gear unit.

The friction type variable transmission unit and the planetary gear unit 20 are structurally the same as the prior art shown in FIGS. 14 and 15. Thus, like elements are denoted by like numerals and their description is omitted.

In the third invention, as shown in FIG. 10, the transmission unit and the planetary gear unit 20 are mounted in a common housing 1a. Its one end is capped with a closure member 82 carrying a trochoid pump 81 in its center.

The trochoid pump 81 has a rotor coupled to the input shaft 25 of the planetary gear unit 20. While the input shaft 25 is rotating, the pump 81 draws up lubricating oil in an oil tank 83 (to be described later).

The oil tank 83 is mounted to the bottom of the housing 1a. The oil circulated through the transmission is returned into the tank 83. The bottom plate of the housing 1a has, on the side of the transmission unit, an oil discharge port 84 through which lubricating oil is discharged into the oil tank 83.

The transmission unit and the gear unit 20 are separated by a partitioning wall 85 of the housing. The wall 85 has holes 86 through which lubricating oil in the gear unit 20 flows back into the oil tank 83.

A strainer 87 and a relief valve 88 are provided in the oil tank 83. They are connected through passages 89 and 90 formed in the wall of the housing 1a to the trochoid pump 81.

A passage 91 branches from the passage 90 and communicates with a passage 92 formed in the front part of the transmission unit. Lubricating oil is supplied through the passage 92 to the inner-diameter surface of the carrier 5, the support portions of the double cones 4, and the frictional contact surfaces of the double cones 4 and the input ring 7.

The lubricating oil in the oil tank 83 is sucked up through the strainer 87 and the passage 89 into the trochoid pump 81 and then supplied through the passage 90 into the passage 91. The oil pressure in the passage 90 is regulated by the relief valve 88.

From the passage 91, the lubricating oil flows through a passage formed in the housing (not shown) into the passage 92 and then supplied to the parts in the friction type variable transmission unit.

The lubricating oil thus circulated through the friction type variable transmission unit and the planetary gear unit 20 is returned through the holes 86 and the oil discharge port 84 into the oil tank 83. The oil returned into the tank 83 is again sucked up by the trochoid pump 81 and supplied to the various parts in the transmission. This cycle is repeated.

The oil pump for sucking up lubricating oil is not limited to the trochoid pump 81 but may be a gear pump or any other type of pump.

Figure 12:
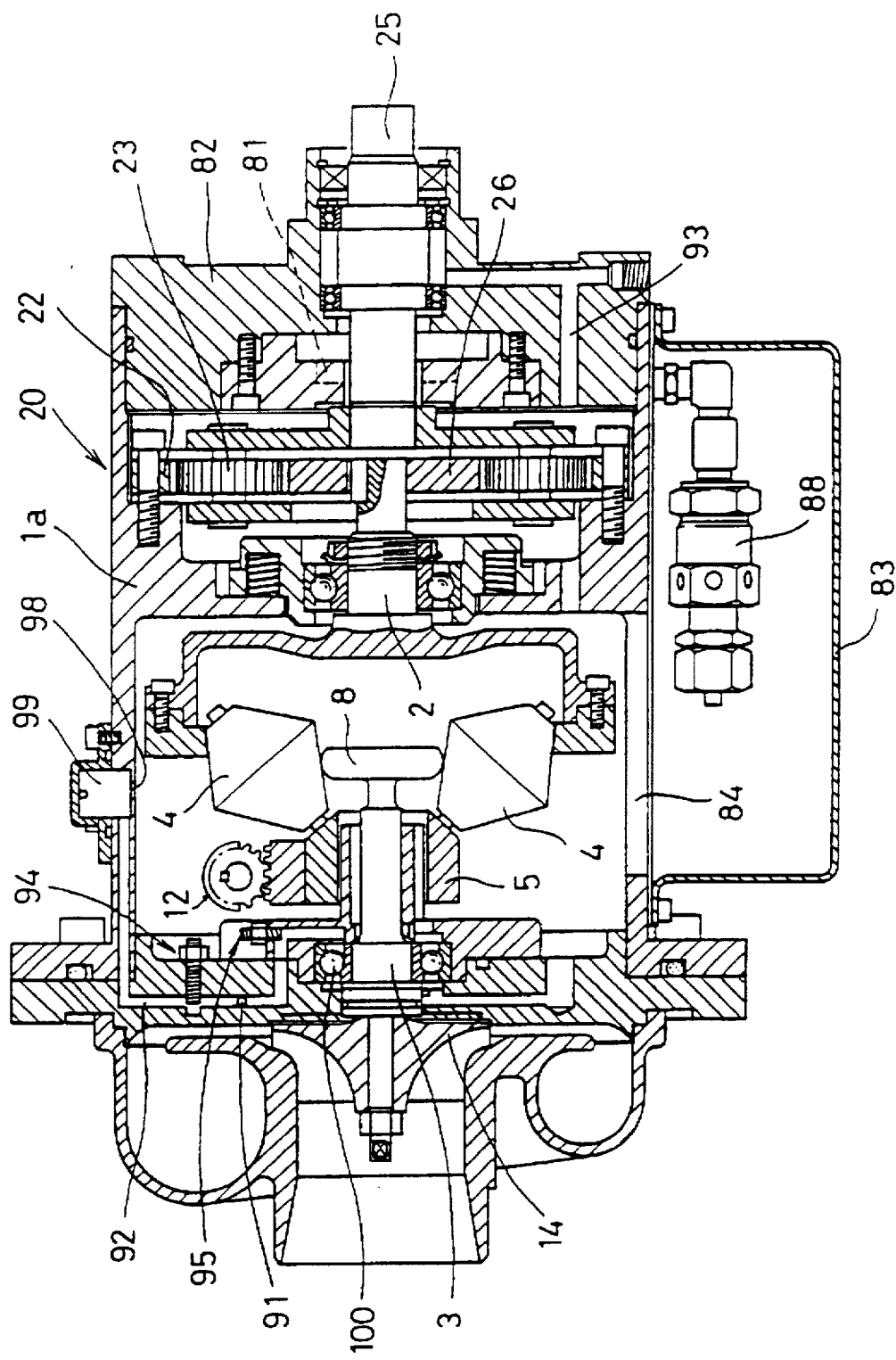
FIG. 12 is a vertical sectional view of another embodiment.
Figure 13:
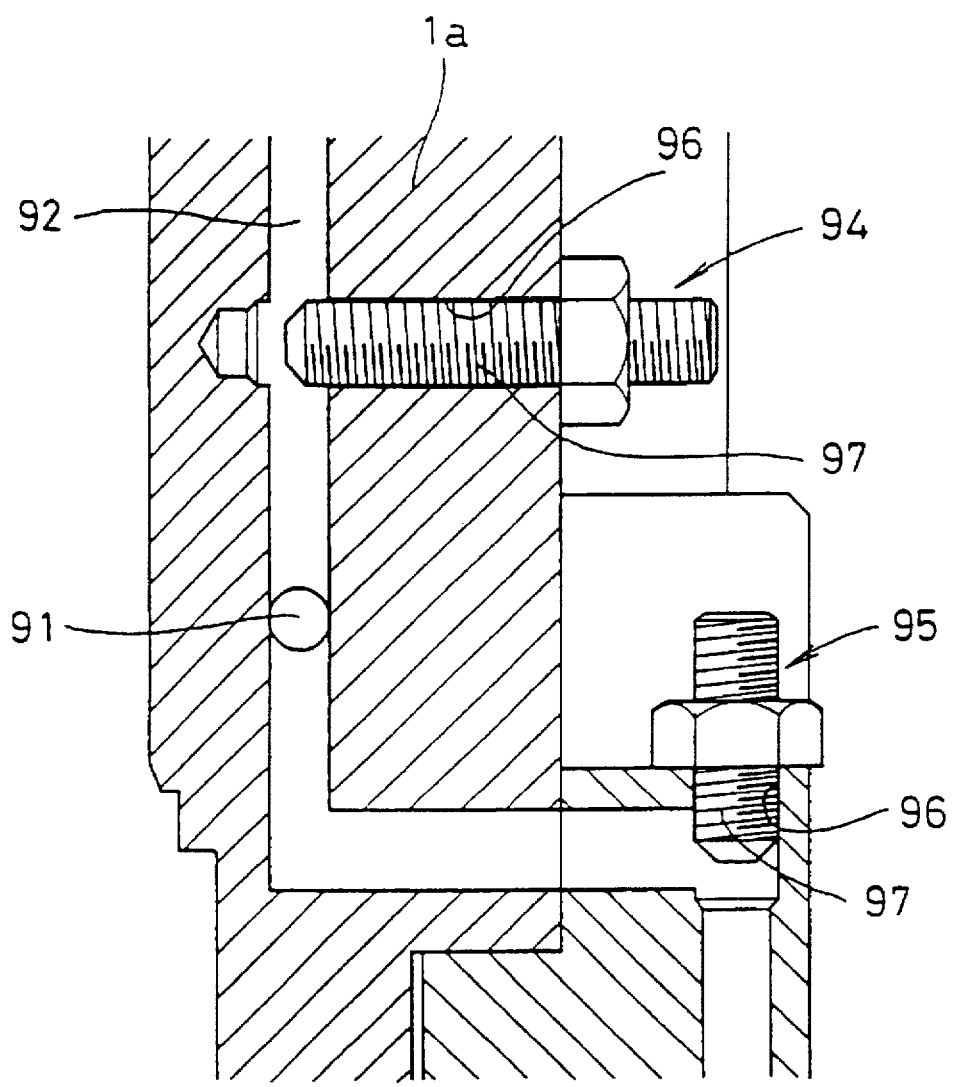
FIG. 13 is a partial enlarged sectional view of the same.

FIGS. 12 and 13 show another embodiment according to the third aspect of the invention.

In this embodiment, screw-in type throttle valves 94 and 95 are provided in the passage 92 formed in the front wall of the housing 1a.

The throttle valves 94 and 95 are setscrews 97 engaged in threaded holes 96 intersecting the passage 92. By adjusting the lengths of the portions of the screws 97 protruding into the passage 92, the sectional area of the passage 92, which determines the flow rate of lubricating oil, is changeable.

A spray 99 is provided at an oil outlet 98 formed in the top wall of the housing 1a and so as to communicate with the passage 92. It sprays the lubricating oil supplied from the passage 92 through the oil outlet 98.

By changing the sectional area of the passage 92 with the throttle valve 94, the oil flow rate through the passage 92, i.e. the amount of oil supplied to the spray 99, can be adjusted to an optimum level. The oil supplied into the spray 99 is sprayed through the outlet 98 and supplied uniformly in the form of mist to the contact surfaces between the double cones 4 and the drive cone 8 and the contact surfaces between the double cones 4 and the input ring 7.

By adjusting the throttle valve 95, it is possible to regulate the amount of lubricating oil flowing into an output bearing 100. In the embodiment, screw-in type throttle valves are used. But bush type throttle valves may be used instead. Also, valves other than throttle valves may be used to adjust the sectional area of the passage 92.

The spray 99 may be one capable of spraying lubricating oil radially within a wide angular range.

Industrial application

In the first aspect of the invention, the rotation preventive means prevents the rotation of the carrier supporting the double cones while allowing only its axial movement. The double cones, prevented from rotating about the input shaft, operate stably.

By providing the stopper for restricting the axial movement of the carrier and/or by providing the support shafts for the double cones with large-diameter portions to prevent the double cones from coming off of the shafts, it is possible to restrict the movement of double cones within a proper range. This makes it possible to prevent the double cones from getting out of contact with the input or output shaft.

In the second aspect of the invention, the friction type variable transmission can be stopped when there is no need to increase the revolving speed. This makes it possible to minimize the loss of engine power. Also, it is possible to minimize the wear of the rotary members in the transmission and thus to prolong its life.

By coupling the input shaft to the clutch through the rotation preventive means which allows axial movement of the input shaft it is possible to prevent the input shaft from interfering with the clutch even if it moves axially, biased by elastic members. Thus, torque can be transmitted stably in the transmission.

In the third aspect of the invention, the lubricating oil in the oil tank is suctioned by the oil pump and supplied through the passage formed in the housing to various inner parts of the friction type variable transmission unit and the planetary gear unit. Thus, they can be lubricated stably.

Since the oil feed passage is formed in the housing wall, and the oil pump is mounted in the planetary gear unit, the entire transmission is sufficiently compact in size, and yet it maintains a high speed increasing capacity.

By controlling the flow rate of oil in the passage with a valve, it is possible to distribute a proper amount of lubricating oil to various parts in the transmission to lubricate them in an optimum way.

By providing the spray means for spraying lubricating oil in the housing, it is possible to supply lubricating oil uniformly to various parts in the transmission. This further improves the lubrication condition in the transmission.

We claim:

1. A friction type continuously variable transmission comprising an input shaft, an output shaft provided coaxially with said input shaft, a plurality of double cones kept in contact with both said input shaft and said output shaft so as to be movable in the axial direction of said input and output shafts, a biasing means biasing said input shaft away from said double cones so that said double cones are pulled by said input shaft and said output shaft in opposite directions, a clutch coupled to said input shaft for, and a rotation preventive means provided between said input shaft and said clutch for preventing the rotation of said input shaft relative to said clutch while allowing axial movement of said input shaft.

2. A friction type continuously variable transmission comprising a friction type variable transmission unit having a housing and an input member, a gear unit coupled to said input member and having an input shaft for transmitting the rotation of said input shaft to said input member, an oil tank provided below said transmission unit and said gear unit for collecting lubricating oil circulated through said transmission unit and said gear unit, and an oil pump mounted on said input shaft of said gear unit for suctioning the lubricating oil in said oil tank, said housing of said transmission unit being provided with a passage through which the lubricating oil suctioned by said oil pump is supplied to said transmission unit and said gear unit.

3. A friction type continuously variable transmission as claimed in claim 2 and further comprising a valve in said passage for changing the sectional area of said passage.

4. A friction type continuously variable transmission as claimed in claim 3 wherein a lubricating oil outlet is formed in a top wall of said housing and connected with said passage, and wherein a spray means is provided at said oil outlet for spraying lubricating oil into said housing.

5. A friction type continuously variable transmission as claimed in claim 2 wherein a lubricating oil outlet is formed in a top wall of said housing and connected with said passage, and wherein a spray means is provided at said oil outlet for spraying lubricating oil into said housing.

6. A friction type continuously variable transmission, comprising:

an input shaft;

an output shaft;

a carrier slidably mounted around said output shaft and movable in the axial direction of said input shaft;

a plurality of double cones connected with both said input shaft and said output shaft for transmitting the rotation of said input shaft to said output shaft, said plurality of double cones being mounted with said carrier such that movement of said carrier in the axial direction moves said double cones in the axial direction and changes the revolving speed of said output shaft; and means for preventing rotation of said carrier about said output shaft while allowing axial movement of said carrier along said output shaft;

wherein said carrier comprises support shafts extending into holes in respective said double cones and rotatably supporting said double cones, each of said support shafts having a free end having a large-diameter portion that is larger in diameter than said holes formed in said double cones.

7. The friction type continuously variable transmission of claim 6, wherein said rotation preventive means further comprises a stopper restricting axial movement of said carrier.

* * * * *